United States Patent [19]

Theis et al.

[11] 4,270,024
[45] May 26, 1981

[54] TELEPHONE LINE ACTIVITY MONITOR

[75] Inventors: Peter Theis, McHenry; Gregory D. Buchberger, Mt. Prospect; William J. Krueger, Vernon Hills, all of Ill.

[73] Assignee: Morgan Electronics, Chicago, Ill.

[21] Appl. No.: 972,326

[22] Filed: Dec. 22, 1978

[51] Int. Cl.³ .............................................. H04M 3/36
[52] U.S. Cl. ............................ 179/8 A; 179/175.2 R; 179/175.2 A; 179/84 R; 179/1 PC
[58] Field of Search .............. 179/8 R, 8 A, 99, 84 R, 179/1 PC, 1 MN, 175.2 R, 175.2 A, 175.2 B, 175.2 C, 7 R, 9, 15 BF, 2 A

[56] References Cited

U.S. PATENT DOCUMENTS

| 3,469,036 | 9/1969 | Meri | 179/84 R |
|---|---|---|---|
| 3,736,379 | 5/1973 | Kagan | 179/1 PC |
| 3,806,669 | 4/1974 | Goldberg | 179/1 MN |
| 3,829,618 | 8/1974 | Brandon | 179/175.2 C |
| 3,842,216 | 10/1974 | Owen et al. | 179/84 R |
| 3,944,758 | 3/1976 | Carney et al. | 179/1 PC |
| 4,066,848 | 1/1978 | Darwood | 179/84 R |
| 4,076,970 | 2/1978 | Lubarsky, Jr. et al. | 179/175.2 R |

Primary Examiner—Gerald L. Brigance
Attorney, Agent, or Firm—Hume, Clement, Brinks, Willian & Olds, Ltd.

[57] ABSTRACT

A portable line activity monitor is disclosed which utilizes a dedicated computer to tabulate a wide range of line traffic parameters. Preferably this monitor is used with a bridging adapter which accepts standard 50 pin telephone connectors as inputs in either the six line or the ten line pin format without adjustment or alteration, and the monitor computer is programmed to ignore all activity on those lines which never enter the idle or onhook state. In the preferred embodiment the computer is also programmed to store and display preselected parameters as histograms, to discriminate between incoming and outgoing calls based on the presence or absence of a ring prior to a line going off hook, and to recognize a ring by measuring the frequency of major fluctuations in the signal on the T-R pair of a telephone line.

12 Claims, 7 Drawing Figures

FIG. 1

FIG.2A STANDARD SIX LINE CONNECTOR

FIG.2B STANDARD TEN LINE CONNECTOR

FIG.2C SIGNALS TRANSMITTED INTO MONITOR

FIG. 5
ALLOWABLE STATE TRANSITIONS

TELEPHONE LINE ACTIVITY MONITOR

BACKGROUND OF THE INVENTION

The present invention is directed to an improved, portable line activity monitor for measuring and storing information indicative of the volume of calls on a set of telephone lines and the speed and efficiency with which these calls are answered and serviced.

Currently, various types of devices for measuring telephone traffic are available. In general, these devices fall into two groups: portable devices which measure a limited number of parameters related to telephone traffic, and fixed installations which employ large computer systems permanently connected to specific telephone lines to measure line usage. Also, various telephone companies will perform studies on requests which measure much the same information.

A need presently exists for a small, portable line activity monitor which can be readily and quickly connected to standard telephone equipment, which provides a better, more complete measure of telephone traffic than portable systems of the prior art, and which may be used with various types of standard telephone equipment without modification to the monitor.

SUMMARY OF THE INVENTION

The present invention is directed to a portable microprocessor based line activity monitor which measures a large number of telephone traffic parameters but which is easily and readily interconnected with standard telephone equipment.

One feature of the invention is that the monitor may be provided with a bridging adapter to permit the monitor to be connected in parallel with a piece of telephone equipment. Preferably, the bridging adapter is provided with 50-conductor connectors which mate with standard telephone connectors in order to eliminate the need for any custom wiring in connecting the monitor to the telephone lines. Furthermore, the applicants have discovered that the bridging adapter can be designed to permit a single connector to be used in conjunction with both 10 line and 6 line station equipment. This embodiment of the bridging adapter is especially preferred, for it allows both of the two major types of station equipment (6 line and 10 line sets) to be used with the monitor of this invention without any adjustment or selection on the part of the monitor user.

Another feature of the invention is that the monitor may be designed to distinguish between incoming and outgoing calls on the basis of whether or not the line was ringing at the time is was picked up. This feature is particularly advantageous in lightweight, portable monitors, for it eliminates the need for tone detectors to recognize the dialing tones characteristic of an outgoing call.

Another related feature of the invention is a novel means for recognizing a ringing call. According to this feature, a microprocessor is used to measure the frequency of the signal on the voice pair (the so-called Tip and Ring, or T-R circuit) in order to detect a ringing call, thereby eliminating the need for separate circuits to perform this function.

Yet another feature of the invention is that the measured traffic parameters are preferably displayed in the form of histograms. For example, the monitor can be designed to measure the total number of calls that are answered after one ring, after two rings, after three rings, etc. This provides a detailed measure of important traffic parameters which measure contains much more information than merely the average and the standard deviation, as provided by many monitors of the prior art.

The present invention, along with further objects and attendant advantages, will be best understood by reference to the following detailed description taken in conjunction with the appended drawings.

DETAILED DESCRIPTION OF A PREFERRED EMBODIMENT

Figure 1:
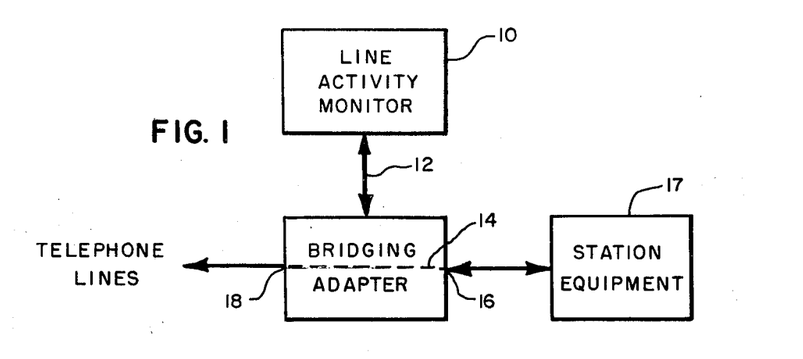
FIG. 1 is a block diagram showing the major components of a preferred embodiment of the line activity monitor of the present invention.

Referring now to the drawings, a schematic representation of a preferred embodiment of the present invention is shown in FIG. 1. This embodiment includes a monitor 10 coupled by a cable 12 to a bridging adapter 14. The bridging adapter 14 is provided with at least two connectors 16,18 which are used to connect the adapter 14 to a piece of station equipment 17 and to a set of telephone lines, respectively. The bridging adapter 14 serves to complete the connection between the station equipment 17 and the telephone lines in order to permit normal equipment operation. It also connects the monitor 10 the the telephone lines, in parallel with the station equipment 17, in order to permit the monitor to sense the state of the telephone lines.

The monitor 10 is a microprocessor based system which tabulates such information as the number of incoming and outgoing calls, the number of incoming calls on each line, the number of lost calls, the number of abandoned calls, the ringing time, conversation time, and holding time of each call, and the time all telephone lines were busy, for example. The detailed operation and structure of the presently preferred embodiment of the monitor 10 will be described below in conjunction with FIGS. 3 and 4. In general, it may be said that the monitor of this invention is a small, lightweight, portable system which can be installed in a briefcase for easy transportation. This monitor offers a flexibility and degree of precision which has previously been unavailable in portable line activity monitors.

One important purpose of the bridging adapter 14 is to facilitate connecting the monitor 10 to standard telephone equipment. The great majority of multiline telephone equipment in this country uses a standard 50 pin connector to couple the equipment to the telephone lines. The same connectors are used both for equipment which is tied to six telephone lines (FIG. 2a) and equipment tied to ten telephone lines (FIG. 2b) and larger equipment connectors are commonly built up from a plurality of the six-line and ten-line connectors. Thus, the two pin arrangements of FIGS. 2a and 2b together represent the most commonly used pin configurations in multiline telephone equipment.

Figure 2A:
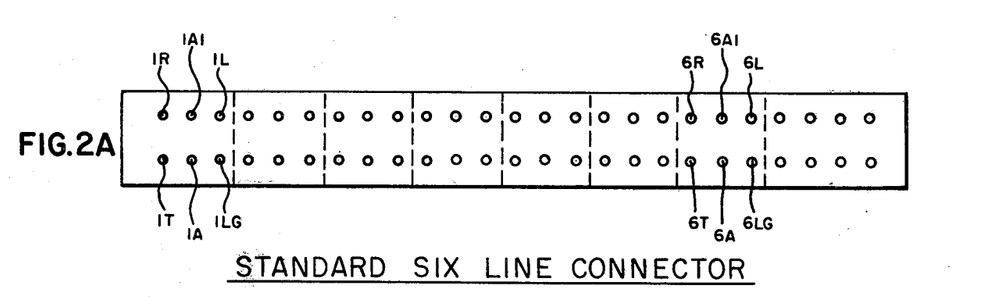
FIGS. 2a, 2b, and 2c are pin diagrams showing the standard configuration of a six-line 50 pin connector (FIG. 2a), a ten-line 50 pin connector (FIG. 2b), and the signals applied as inputs to the monitor of this invention (FIG. 2c).
Figure 2B:
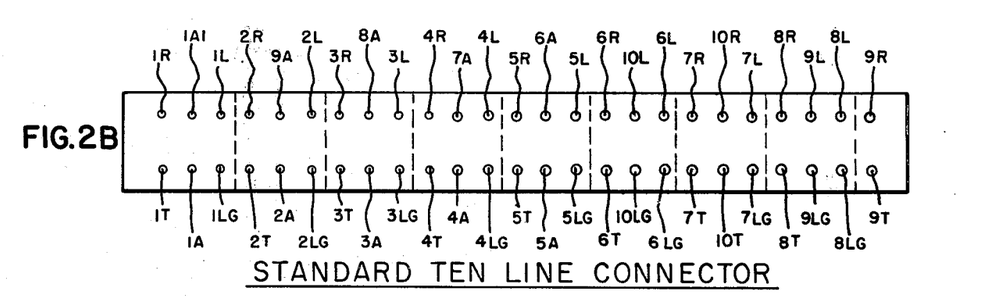
Figure 2C:
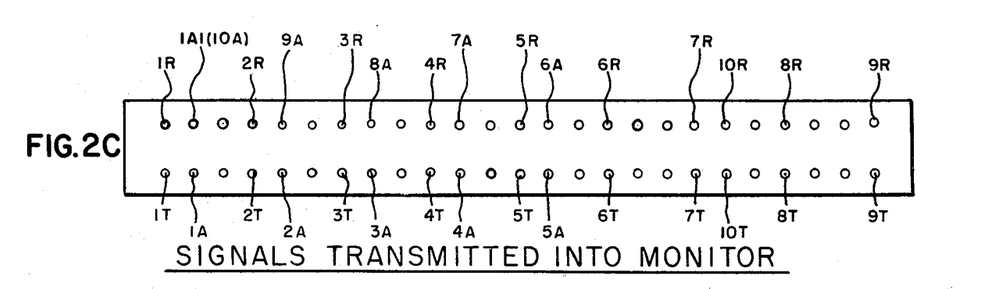

The preferred embodiment of FIG. 1 is provided with standard 50 pin connectors 16,18, and signals for the monitor 10 are taken from the pins as shown in FIG. 2c. This same configuration is used both when six-line connectors (FIG. 2a) and ten-line connectors (FIG. 2b) are plugged into the adapter 14. As will be described below, this allows the same monitor 10 and adapter 14 to be used on both six- and ten-line equipment, all without adjustment or modification either to the equipment or to the monitor.

The following symbols are used in FIGS. 2a, 2b and 2c to identify the various lines in the connectors: NT and NR designate the Tip and Ring circuits of the Nth telephone line; NA and NA1 designate the control signal for the Nth line and the control signal ground; NL and NLg designate the lamp signal and the lamp signal ground for the Nth line. As shown in FIG. 2a, there are six circuits associated with every telephone line: T, R, A, A1, L, Lg. In order to reduce the total number of pins, the ten-line connector uses the same control signal ground for all ten telephone lines, and, therefore, lines 2-9 use only five pins: T, R, A, L and Lg. In the case where A1 is provided via some other source, ten lines can be routed through a 50 pin connector by assigning these five pins to each of the ten lines.

As shown in FIG. 2c, the same pin configuration is used to interface with both six- and 10-line connectors. This is accomplished by providing a common control signal ground for lines 1 through 6, whether or not separate grounds are provided in the incoming connector. This arrangement allows the same bridging adapter 16 and monitor 10 to be used both with ten-line connectors and six-line connectors without modification. The signals supplied to the monitor and their pin assignments are shown in FIG. 2c.

The way in which these signals are processed in the monitor to determine the state of each line will be described in detail below. Here it is enough to state that a high voltage between NT and NR (about 48 volts) indicates an on-hook condition where the telephone equipment is ready to receive an incoming call on line N, whereas a low voltage between NT and NR indicates an off-hook condition. The voltage between NA1 and NA is high when line N is on hold and low when line N is being serviced.

Figure 3A:
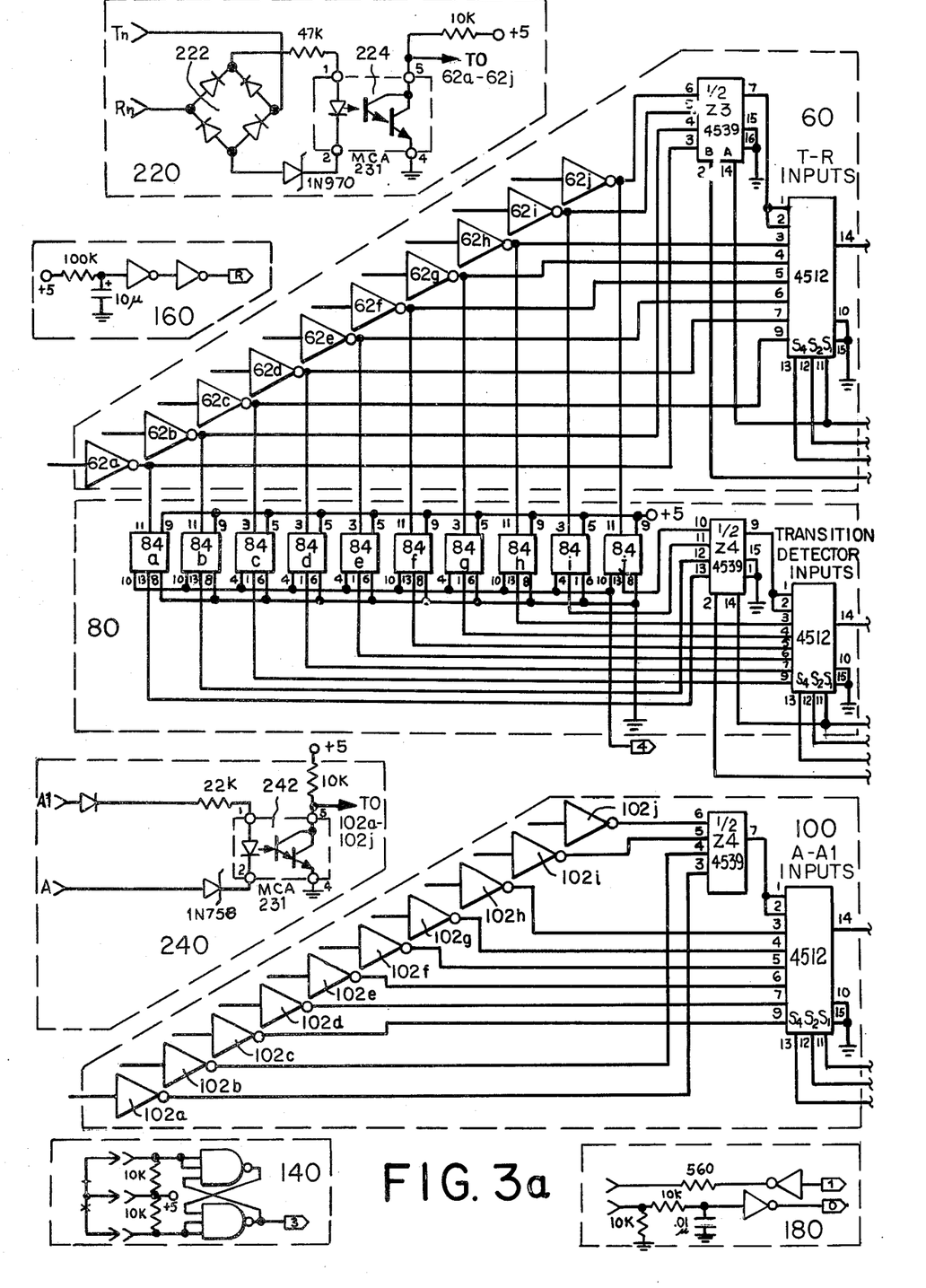
FIGS. 3a and 3b are schematic diagrams of the preferred embodiment of the monitor of FIG. 1.
Figure 3B:
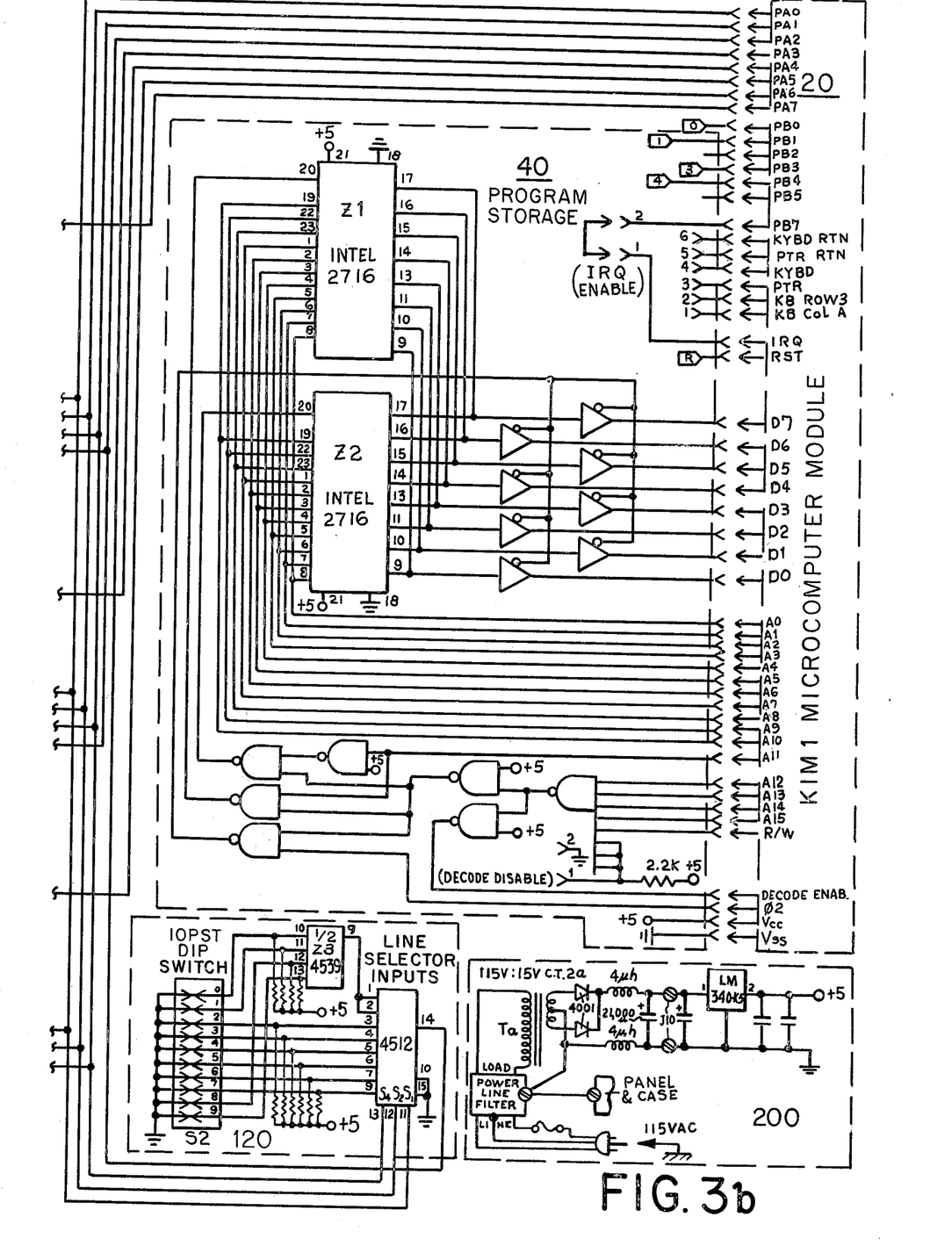

Referring now to FIG. 3, the preferred embodiment of the monitor 10 includes a microcomputer 20; a memory 40; a T-R input circuit 60; a T-R transition detector input circuit 80; an A-A1 input circuit 100; a line enable circuit 120; a mode selector circuit 140; a power-on reset circuit 160; an expansion interface circuit 180, and a power supply circuit 200. An interface circuit 220 is supplied for the T-R pair of each line, and an interface circuit 240 is supplied for the A-A1 pair of each line. Each of these circuits will be described in greater detail below.

The microcomputer 20 of this embodiment is a KIM-I microcomputer module developed by MOS Technology, Norristown, Pennsylvania. KIM-I is an 8-bit microcomputer based on the 6502 microprocessor and it includes a keypad input and a 6 digit, 7 segment LED display.

Memory 40 is based on two 2K by 8 bit Read Only Memories, such as Intel 2716 memories, which are connected to the KIM-I in the standard manner, as shown.

The entire computer program can be stored in one of these 2K ROM's, and the other is provided to allow additional capabilities to be programmed, such as printer control, for example.

T-R input circuit 60 is built of a 10 to 1 multiplexer made up of two CMOS circuits: one 4 to 1 multiplexer No. 4539, and one 8 to 1 multiplexer No. 4512. Under program control the computer can select any one of the ten signals on the output terminals of inverting Schmitt Triggers 62a–j for input to the computer. These Schmitt Triggers are preferably CMOS 4584 circuits. As will be explained below, each of the inverting Schmitt Triggers 62a–62j is connected to one of the T-R pairs via an interface circuit 220 and, therefore, T-R input circuit 60 allows the computer to sample the voltage between T and R for each line and to determine whether that voltage is above a threshold level (High or Logic 1) or below a threshold level (Low or Logic 0).

T-R transition detector input circuit 80 includes a 10 to 1 multiplexer identical to that of circuit 60. In this case each of the multiplexed lines is connected to the Q output of a Type D CMOS Flip Flop No. 4013. These flip flops are identified as components 84a–84j of FIG. 3. Each flip flop 84a–84j has its Data input tied high and its Clock input connected to the output of one of the Schmitt Triggers 62a–62j, respectively. All of the Set inputs are held low, and all of the Reset inputs are under computer control. These flip flops are used as latches to detect the transition of the T-R voltage from low to high, and are used in detecting the presence of a ring signal on the T-R pair.

The A-A1 input circuit 100 includes another 10 to 1 multiplexer identical to that of circuit 60. Here, each of the multiplexed lines is tied to the output of one of the inverting Schmitt Triggers such as CMOS 4584 circuits 102–102j, which are in turn connected via one of the interface circuits 240 to the A-A1 pair of one of the lines being monitored.

The line selector circuit 120 also includes a 10 to 1 multiplexer made up of CMOS circuits No. 4539 and 4512. In this case each of the multiplexed lines is connected via a 10 K resistor to +5 volts and via a switch to ground. The switches can be set to designate those lines which are to be monitored by the computer 20.

The mode selector circuit 140 uses a switch and a latch to supply an input to the computer which is either High or Low. This circuit 40 is used to allow an operator to select one of two modes of monitor operation: a monitor mode, in which traffic on the lines is monitored, and a readout mode, in which the tabulated results of the last monitoring period are displayed.

The power-on reset circuit 160 maintains a reset signal on the appropriate input of the computer to prevent computer operation for about 1 second following the application of power to the system to allow the supply voltage to stabilize.

The expansion interface circuit 180 is provided to allow selected all lines busy signals to be exchanged between two or more monitors, as for example when it is desired to monitor a larger number of lines than possible with one monitor.

A power supply 200 is provided to supply +5 volts to operate the monitor. An interface circuit 220 is provided for each of the ten T-R pairs. Each interface circuit includes a full wave bridge 222 which rectifies the T-R signal and an opto-isolator 224 such as an MCA 231 which ensures electrical isolation between the telephone system and the monitor.

An interface circuit 240 is provided for each A-A1 pair, and this circuit 240 also includes an opto-isolator 242.

Figure 4A:
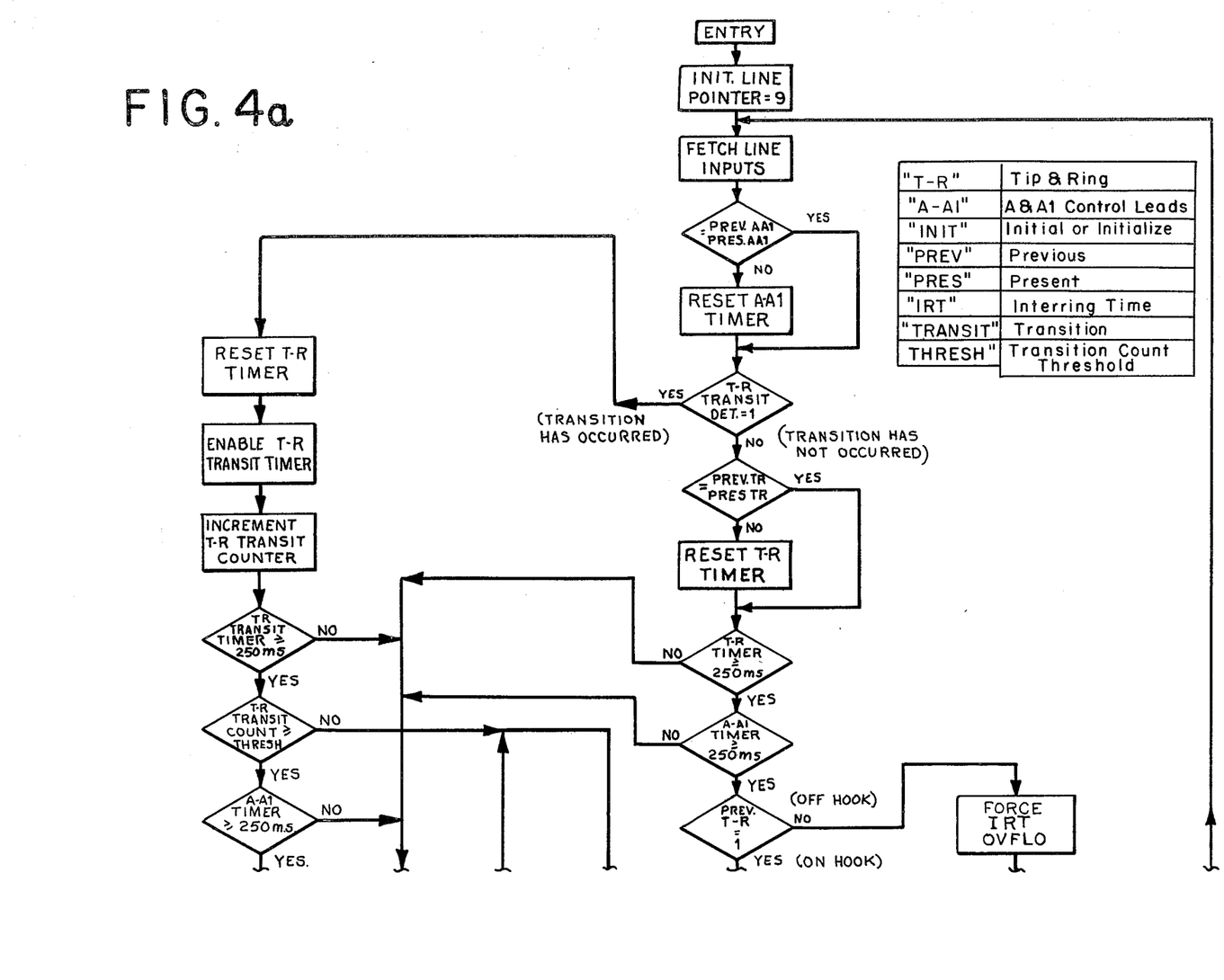
FIGS. 4a and 4b are flow charts for a portion of the program of the preferred embodiment.
Figure 4B:
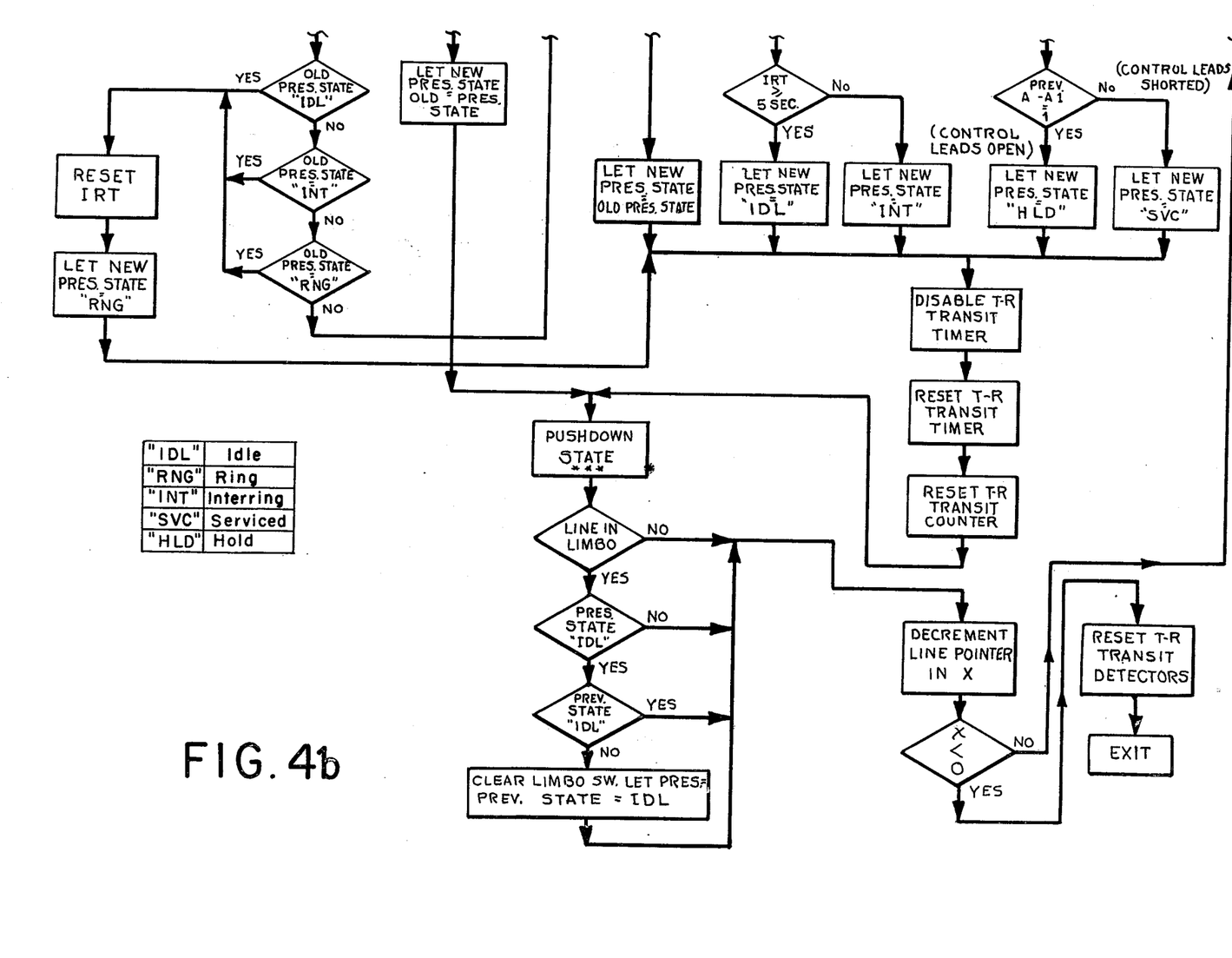

The program for the monitor includes three major routines: (1) a line state update routine which determines which of five states each line is in; (2) a transition tabulating routine which tabulates transitions of the various line states; and (3) a readout routine which displays the tabulated results of the previous monitoring period. In the following description the line state update routine will be explained in conjunction with FIG. 4 and the transition tabulating routine will be explained in conjunction with FIG. 5 and Tables I and II.

Referring now to FIG. 4, the line state update routine is repeatedly executed when the embodiment is in the monitor mode. The computer is programmed to generate an interrupt every 10 milliseconds, and each time an interrupt is received, the routine is executed and the state of each of the ten lines 0-9 is determined and stored.

In the program there are five possible line states as follows: idle (on hook), ring, inter-ring, serviced (off-hook), and hold. The routine of FIG. 4 uses input from the T-R and A-A1 pairs of each line to determine its state.

On first entering the routine the line pointer is set to 9 and the three one-bit variables for that line, T-R, T-R transition, and A-A1 are obtained from circuits 60,80, and 100, respectively, and are temporarily stored for later use. Then the current A-A1 value is compared with the value of A-A1 from the previous pass and the A-A1 timer is reset if these two values are not equal.

The next step is to branch depending on the value of the T-R transition variable. If this variable is 1, indicating that a transition has occurred since the last reading, the right hand branch is executed to determine if the line is ringing. This is done by resetting the T-R timer, starting the T-R transition timer, and incrementing the T-R transition counter. If the T-R transition timer and the A-A1 timer exceed 250 milliseconds, and the T-R transition count exceeds a threshold (equal to four in this embodiment), and the present state is either idle, inter-ring, or ring, then the inter-ring timer is reset and the new present state is set to Ring. The general approach used here to determine when the line is ringing is to watch for transitions of the T-R circuit. This circuit carries the 20 hz ring signal when the line is ringing, and thus the number of transitions can be expected to equal or exceed 4 in a ¼ second period if the line is ringing. Otherwise, the new present state is set equal to the old present state for the line currently being monitored.

If no T-R transition has been detected, then the T-R timer is reset if T-R has changed state. Then the T-R timer and the A-A1 timer are checked. The new present state is set equal to the old present state unless both the T-R signal and the A-A1 signal have remained constant for 250 milliseconds. This acts as a software filter which prevents the computer from acting on transient signals.

Assuming that T-R and A-A1 have remained unchanged for 250 milliseconds, then a new present state is determined for the line. If T-R is High (on-hook), the new present state is set to Idle if the inter-ring timer is greater than or equal to 5 seconds and is set to Inter-ring otherwise. If T-R is low (off-hook) the inter-ring timer is set to a value greater than 5 seconds and the new present state is set to Hold if the A-A1 signal is high and to Serviced otherwise.

At this point the T-R transition timer is disabled and reset and the old present state is stored as the previous state and the new present state is stored as the old present state. Control is then passed to an initializing portion of the routine. In order to properly tabulate line traffic each line starts out in "limbo". That is, it starts in an undefined state and is ignored until it returns to Idle. In this way tabulation is not commenced in the middle of a conversation or a ring. Once a line enters the Idle state it is taken out of limbo and processed normally. This feature of the embodiment ensures that spurious data is not collected. For example, when a six-line connector is plugged into the bridging adapter, lines 7-10 will be unconnected and will never enter the Idle state. These lines will remain in limbo and will not contribute to the tabulated results.

This completes the line state update for one line. At this time the line pointer is decremented and the routine is repeated for the next line until all lines have been processed. Then the T-R transition detect latches 84a-84j are reset and the routine is exited.

Figure 5:
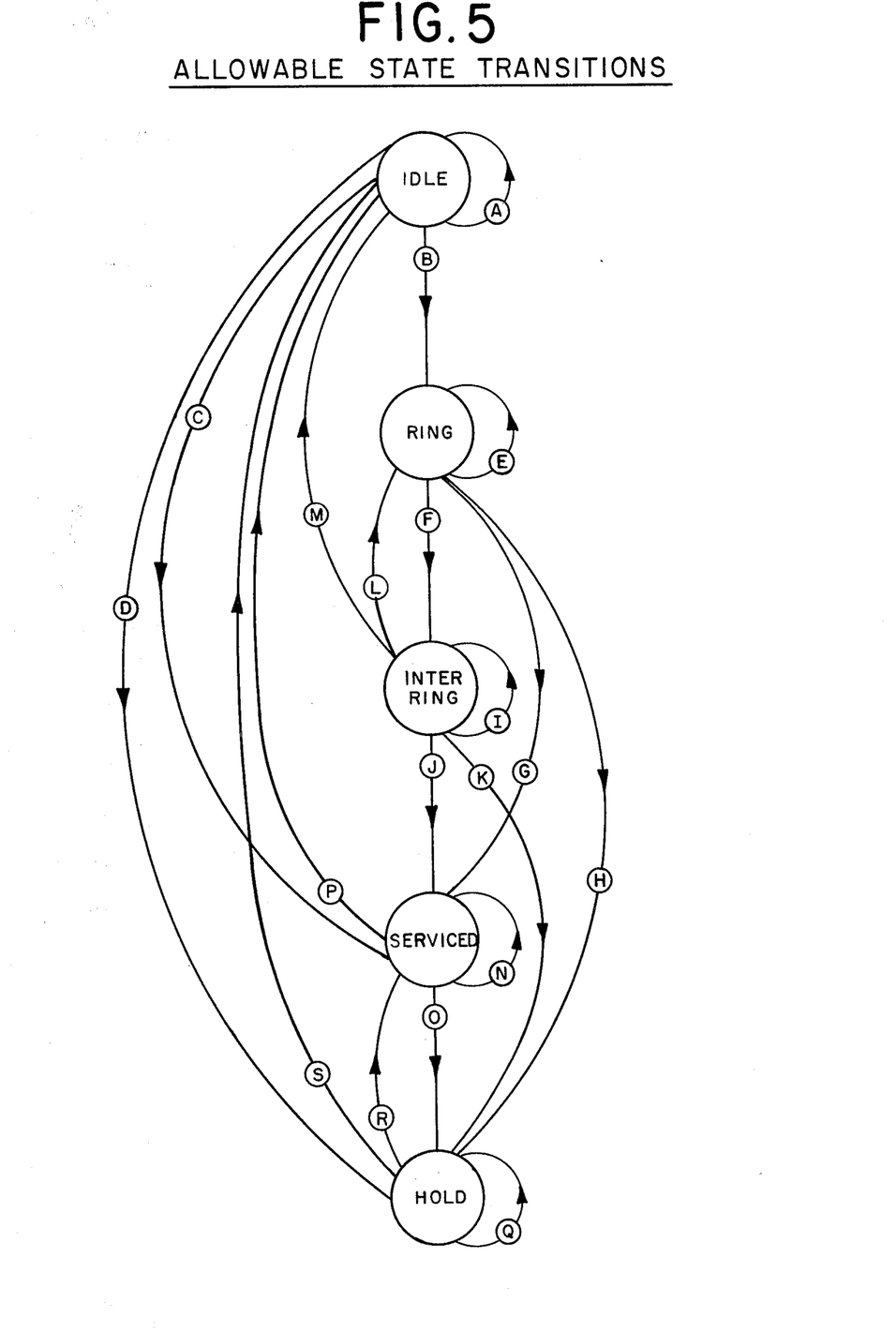
FIG. 5 is a chart showing possible transitions in the state of a telephone line.

After each execution of the line state update routine, control is transferred to a tabulation routine which updates the tabulation of the line traffic. FIG. 5 shows the allowable state transitions among the five states. Each of these transitions is labeled by a letter between a and s, Table I which presents the tabulation which is performed at each transition a-s. Table II lists the counters and timers which are used to store line traffic parameters.

Table I is in effect a flow chart for the tabulating routine. For example, when a line state makes a transition from Serviced to Hold, the program enables the call hold timer and disables the call serviced timer. Thus, the call hold timer begins to measure the length of time the call is on hold and the call serviced timer stops measuring the length of time the call is being serviced. Similarly, when the state of a line goes from Inter-ring to Idle, the computer increments the number of total lost calls, the number of total calls, and the number of calls on line X, and resets the counters and timers for that line.

In this way detailed information is kept on each of the calls on the monitored lines. A review of Table II will indicate the nature of the information which is measured. This information includes the duration of the ring, hold and service periods for each call, the handling of the call (lost, abandoned or serviced), the total number of calls (incoming and outgoing) and the total number of calls (on each line and for all monitored lines). This gives a very detailed picture of the traffic pattern on the monitored lines. Furthermore, multiple counters are provided for preselected parameters such that a histogram of the statistical distribution of those parameters is stored. For example, the preferred embodiment tabulates in separate counters the number of calls kept on hold for 0-30 seconds, 31-60 seconds, 61-90 seconds, etc. This provides the monitor user with a detailed summary of the pattern of hold activity characteristic of the monitored lines and contains much more information that merely the average and standard deviation of all holding times.

Other tabulating routines may be provided to measure parameters relating to activity on two or more lines. For example, all of the selected lines may be sampled to see if any line is either Idle or in limbo. If not, then an all circuits busy timer can be enabled.

The third major routine of the program is a readout routine by which the tabulated totals are displayed by command of the user on the LED display of the computer. This routine is a simple routine which responds to keyboard inputs by displaying the requested parameter.

The foregoing description has described a small, easily portable line activity monitor which can easily be connected to the great majority of all multiline telephone equipment in this country. This monitor is versatile and flexible and it provides a detailed description of the traffic on the monitored lines. One of the particular advantages of the line activity monitor of this invention is that it operates with a minimum of adjustment. For example, it can be used with telephone equipment having as few as one or as many as ten or more lines, all without adjustment. Only if the user requires a tabulation of the time when all lines are busy is it necessary to adjust the monitor to indicate the number of lines being monitored. Furthermore, if the A–A1 lines are inaccessible for any reason, this monitor can operate on the T-R signal only without adjustment. The only difference in performance is that the monitor does not tabulate the number of calls which are abandoned while on hold and the tabulated duration of call servicing includes the time a call is on hold.

Of course, it should be understood that various changes and modifications to the preferred embodiment described herein will be apparent to those skilled in the art. Other computers can be used and the computer used can be programmed to tabulate other traffic parameters. Other output devices such as printers may be used either in conjunction with or instead of the described LED displays. Moreover, line activity monitors for monitoring either a greater or lesser number of lines can be constructed on the same principles as those described above. Such changes and modifications can be made without departing from the spirit and scope of the present invention, and without diminishing its attendant advantages. It is, therefore, intended that such changes and modifications can be covered by the following claims.

TABLE I

| Label | Transition Type | | Action Taken |
|---|---|---|---|
| A | Idle to Idle | I. | None |
| B | Idle to Ring | I. | Increment Nth Ring Counter for Line X. |
| C | Idle to Serviced | I. | Enable Outgoing Call Timer. |
| D | Idle to Hold | I. | Enable Call Serviced Timer. |
|   |   | II. | Set Nth Ring Counter for Line X equal to 1. |
| E. | Ring to Ring | I. | None |
| F. | Ring to Inter-ring | I. | None |
| G. | Ring to Serviced | I. | Enable Call Serviced Timer. |
| H | Ring to Hold | I. | Enable Call Serviced Timer. |
| I | Inter-ring to Inter-ring | I. | None. |
| J | Inter-ring to Serviced | I. | Enable Call Serviced Timer. |
| K | Inter-ring to Hold | I. | Enable Call Serviced Timer. |
| L | Inter-Ring to Ring | I. | Increment Nth Ring Counter for Line X. |
| M | Inter-ring to Idle | I. | Increment Total Lost Calls |
|   |   | II. | Increment Total Calls |
|   |   | III. | Increment Total Calls on Line X |
|   |   | IV. | Reset Timers and Counters |
| N | Serviced to Serviced | I. | None. |
| O | Serviced to Hold | I. | Enable Call Hold Timer |
|   |   | II. | Disable Call Serviced Timer |
| P | Serviced to Idle | I. | Test Outgoing Call Timer (OCT) enable flag: |
|   |   |   | A. If OCT is enabled: |
|   |   |   | (1) Test Outgoing Call Timer: |
|   |   |   | (a) If Outgoing Call Timer $\geq$ 10 sec.: |
|   |   |   | (i) Increment Total Outgoing Calls |
|   |   |   | (ii) Flag outgoing call ($C_f = 1$) |
|   |   |   | (iii) Reset timers and counters |
|   |   |   | (b) If Outgoing Call Timer < 10 sec.: |
|   |   |   | (i) Flag outgoing call ($C_f = 1$) |
|   |   |   | (ii) Reset timers and counters |
|   |   |   | B. If OCT is not enabled: |
|   |   |   | (1) Flag call as incoming ($C_f = 0$) |
|   |   | II. | If call is incoming: |
|   |   |   | A. Increment Total Calls |
|   |   |   | B. Increment Total Calls on Line X |
|   |   |   | C. Fetch Nth Ring Counter for Line X |
|   |   |   | D. Increment Total Calls Serviced by Nth ring |
|   |   |   | E. Fetch Call Serviced N Min. Timer |
|   |   |   | F. Increment Total Calls Serviced N minutes |
|   |   |   | G. Fetch Call Held N $\times$ 30 sec. |
|   |   |   | H. Increment total calls held N 30 sec. periods |
|   |   |   | I. Reset timers and counters |
|   |   | III. | If call is outgoing: |
|   |   |   | A. None |
| Q | Hold to Hold | I. | None |
| R | Hold to Serviced | I. | Enable Call Serviced Timer |
|   |   | II. | Disable Call Hold Timer |
| S | Hold to Idle | I. | Test Outgoing Call Timer (OCT) enable flag: |
|   |   |   | A. If OCT is enabled: |
|   |   |   | 1. Test Outgoing Call Timer: |
|   |   |   | (a) If Outgoing Call Timer $\geq$ 10 sec: |

TABLE I-continued

| Label | Transition Type | Action Taken |
|---|---|---|
| | | (i) Increment Total Outgoing Calls |
| | | (ii) Flag outgoing call ($C_f = 1$) |
| | | (iii) Reset timers and counters |
| | | (b) If Outgoing Call Timer < 10 sec: |
| | | (i) Flag outgoing call ($C_f = 1$) |
| | | (ii) Reset timers and counters |
| | | B. If OCT is not enabled: |
| | | 1. Flag call as incoming ($C_f = 0$) |
| | II. | If call is incoming: |
| | | A. Test Call Hold Timer enable flag: |
| | | 1. If Call Hold Timer was enabled: |
| | | (a) Increment Total Abandoned Calls |
| | | (b) Proceed to . . . 2. (a) |
| | | 2. If Call Hold Timer was not enabled: |
| | | (a) Increment Total Calls |
| | | (b) Increment Total Calls on Line X |
| | | (c) Fetch Nth Ring Counter for Line X |
| | | (d) Increment Total Calls Serviced by Nth ring |
| | | (e) Fetch Call Serviced N × Min. Timer |
| | | (f) Increment Total Calls Serviced N Minutes |
| | | (g) Fetch Call Held N × 30 sec. Timer |
| | | (h) Increment Total Calls Held N × 30 sec. |
| | | (i) Reset timers and counters |
| | III. | If call is outgoing: |
| | | A. None |

TABLE II

| | |
|---|---|
| *Nth Ring Counter - Line X: | Stores the number of rings on the current call. |
| *Outgoing Call Timer - Line (X) | Times the duration of the current outgoing call. |
| *Call Serviced Timer - Line (X): | Times the duration the current incoming call is being serviced. |
| *Call Hold Timer - Line (X): | Times the duration current call is on hold. |
| Total Calls: | Stores the total number of calls. |
| Total Lost Calls: | Stores the total number of unanswered calls. |
| Total Outgoing Calls: | Stores the total number of outgoing calls. |
| Total Abandoned Calls: | Stores the total number of calls abandoned by caller while on hold. |
| *Total Calls on Line (X): | Stores the total number of calls on Line X. |
| **Total Calls Serviced N Minutes: | Stores the total number of calls serviced for N minutes but less than N + 1 minutes. |
| **Total Calls Serviced by Nth Ring: | Stores the total number of calls serviced by the Nth ring but before the N + 1 ring. |
| **Total calls held N × 30 seconds: | Stores the total number of calls held less than N × 30 seconds but more than (N − 1) × 30 seconds. |

*Indicates ten separate counters or timers are provided, one for each line.
**Indicates a number of separate registers are provided for N = 1, N = 2, N = 3 . . . etc.

We claim:

1. A portable monitor for use with station equipment connected to a plurality of telephone lines by way of first and second mating connectors directly associated with said station equipment, said monitor comprising:
monitor means including a portable computer programmed to tabulate a plurality of telephone line traffic parameters representative of the line activity and usage patterns of a predetermined maximum number of monitor input channels;
adapter means for connecting said monitor input channels to the plurality of telephone lines, said adapter means including first connector means for mating with said first connector and second connector means for mating with said second connector, said adapter means further including means for interconnecting the station equipment and the telephone lines.

2. The monitor of claim 1 wherein the first and second connector means are configured to mate with 50 pin connectors.

3. A portable line activity monitor for monitoring traffic on a plurality of telephone lines, said monitor comprising:
monitor means including a portable computer programmed to tabulate a plurality of telephone line traffic parameters representative of the line activity and usage patterns of said plurality of telephone lines;
means for interconnecting the monitor means with said plurality of telephone lines;
designation means, included in the monitor means, for designating one of said plurality of telephone lines as in the ring state when a signal corresponding to the T-R voltage for said one telephone line crosses a predetermined threshold more than a predetermined number of times in a predetermined time period
means, included in the monitor means, for designating when said telephone line is in the off-hook state; and
means, included in the monitor means and responsive to the ring and off-hook designating means, for suppressing the designation of said telephone line as in the ring state when the immediately preceding state of said telephone line was the off-hook state, indicating a direct transition of said telephone line from the off-hook state to the ring state.

4. A portable line activity monitor for monitoring traffic on a plurality of telephone lines, said monitor comprising:
monitor means including a portable computer programmed to tabulate a plurality of telephone line traffic parameters representative of the line activity and usage patterns of said plurality of telephone lines;

means for interconnecting the monitor means with said plurality of telephone lines;

means, included in the monitor means, for repeatedly determining the state of one of said plurality of telephone lines;

means, also included in the monitor means and responsive to the state determining means, for detecting and designating a state transition of said one line directly from an idle state to an off-hook state without an intervening ring state;

means for determining when said one line has remained in the off-hook state for more than a predetermined time period; and means, responsive to said detecting means and said determining means, for tabulating calls, which are associated with state transitions designated by the detecting means and which remain in the off-hook condition for more than said predetermined time period, as outgoing calls.

5. A portable line activity monitor for use with station equipment connected to a plurality of telephone lines by way of first and second mating connectors directly associated with said station equipment, said monitor comprising:

monitor means including a portable computer programmed to tabulate a plurality of telephone line traffic parameters representative of telephone line activity and usage patterns of a plurality of monitor input channels;

adapter means for connecting said plurality of monitor input channels to the plurality of telephone lines;

first connector means, included in said adapter means, for mating with said first connector;

second connector means, included in said adapter means, for mating with said second connector; and means, included in the adapter means, for interconnecting the station equipment and the telephone lines;

said first and second connector means being adapted to mate both with standard six line and standard ten line telephone connectors such that the adapter means interconnects the monitor input channels with the Tip, Ring, and On Hold Control circuits for each of the telephone lines routed through the adapter means.

6. The line activity monitor of claim 5 further comprising means, included in the monitor means, for automatically suppressing tabulation of activity on monitor input channels which are unconnected to a telephone line.

7. A portable line activity monitor for use with station equipment connected to a plurality of telephone lines by way of first and second mating connectors directly associated with said station equipment, said monitor comprising;

monitor means including a portable computer programmed to tabulate a plurality of telephone line traffic parameters representative of telephone line activity and usage patterns of a plurality of monitor input channels;

adapter means for connecting said plurality of monitor input channels to the plurality of telephone lines;

first connector means, included in said adapter means, for mating with said first connector;

second connector means, included in said adapter means, for mating with said second connector;

means, included in the adapter means, for interconnecting the station equipment and the telephone lines; and means, included in the monitor means, for automatically suppressing tabulation of activity on monitor input channels which are unconnected to a telephone line;

said first and second connector means being adapted to mate both with standard six line and standard ten line telephone connectors such that the adapter means interconnects the monitor input channels with the Tip, Ring, and On Hold Control circuits for each of the telephone lines routed through the adapter means.

8. The line activity monitor of claim 7 wherein the means for suppressing tabulation includes means for preventing tabulation of activity on each monitor input channel until said channel enters the Idle state.

9. A portable line activity monitor for monitoring traffic on a plurality of telephone lines, said monitor comprising:

monitor means including a portable computer programmed to tabulate a plurality of telephone line traffic parameters representative of the line activity and usage patterns of said plurality of telephone lines;

means for connecting said monitor means with said plurality of telephone lines;

first, second, and third register means, included in said monitor means, for storing first, second, and third counts, respectively;

means, included in said monitor means, for incrementing said first count when one of said plurality of telephone lines is in the hold state for a time period falling within a first time interval;

means, included in said monitor means, for incrementing said second count when said one telephone line is in the hold state for a time period falling within a second time interval; and means, included in said monitor means, for incrementing said third count when said one telephone line is in the hold state for a time period falling within a third time interval, distinct from said first and second time intervals.

10. A portable line activity monitor for monitoring traffic in a plurality of telephone lines, said monitor comprising:

monitor means including a portable computer programmed to tabulate a plurality of telephone line traffic parameters representative of the line activity and usage patterns of said plurality of telephone lines;

means for connecting said monitor means with said plurality of telephone lines;

first, second, and third register means, included in said monitor means, for storing first, second, and third counts, respectively;

means, included in said monitor means, for incrementing said first count when one of said plurality telephone lines is in the off-hook state for a time period falling within a first time interval;

means, included in said monitor means, for incrementing said second count when said one telephone line is in the off-hook state for a time period falling within a second time interval; and means, included in said monitor means, for incrementing said third count when said one telephone line is in the off-hook state for a time period falling within a third time interval, distinct from said first and second time intervals.

11. A portable line activity monitor for monitoring traffic on at least one telephone line, said monitor comprising:
monitoring means including a portable computer programmed to tabulate a plurality of telephone line traffic parameters representative of the line activity and usage patterns of said at least one telephone line;
means for connecting said monitoring means with said at least one telephone line;
means, included in the monitoring means, for timing the duration of individual off-hook conditions of said at least one telephone line; and
means, included in the monitoring means and responsive to the timing means, for tabulating the time distribution of the duration of individual off-hook conditions, said tabulating means including means for classifying each of said individual off-hook conditions into one of a plurality of categories in accordance with the duration of each of said individual off-hook conditions and means for maintaining a separate count of the total number of said individual off-hook conditions classified in at least two of said plurality of categories.

12. A portable line activity monitor for monitoring traffic on at least one telephone line, said monitor comprising:
monitoring means including a portable computer programmed to tabulate a plurality of telephone line traffic parameters representative of the line activity and usage patterns of said at least one telephone line;
means for connecting said monitoring means with said at least one telephone line;
means, included in the monitoring means, for timing the duration of individual hold conditions for said at least one telephone line; and
means, included in the monitoring means and responsive to the timing means, for tabulating the time distribution of the duration of individual hold conditions, said tabulating means including means for classifying each of said individual hold conditions into one of a plurality of categories in accordance with the duration of each of said individual hold conditions and means for maintaining a separate count of the total number of said individual hold condition classified in at least two of said plurality of categories.

* * * * *

UNITED STATES PATENT AND TRADEMARK OFFICE
CERTIFICATE OF CORRECTION

PATENT NO. : 4,270,024
DATED : May 26, 1981
INVENTOR(S) : Peter Theis, et al.

It is certified that error appears in the above-identified patent and that said Letters Patent are hereby corrected as shown below:

Column 2, line 41, please delete "the", first occurrence, and substitute therefor --to--;

Column 4, line 36, please delete "102-102j" and substitute therefor --102a-102j--;

Column 4, line 47, please delete "40" and substitute therefor --140--;

Column 14, line 14, please delete "for" and substitute therefor --of--.

Signed and Sealed this

Twenty-second Day of September 1981

[SEAL]

*Attest:*

GERALD J. MOSSINGHOFF

*Attesting Officer*  Commissioner of Patents and Trademarks